US008000999B2

(12) United States Patent
Morrisroe et al.

(10) Patent No.: US 8,000,999 B2
(45) Date of Patent: Aug. 16, 2011

(54) METHOD AND SYSTEM FOR CREATING, SERVING AND TRACKING ADVERTISEMENTS

(75) Inventors: Lawrence Morrisroe, Cupertino, CA (US); Joseph Gruender, San Jose, CA (US); Edward Bell, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/696,295

(22) Filed: Oct. 28, 2003

(65) Prior Publication Data
US 2004/0117259 A1   Jun. 17, 2004

Related U.S. Application Data

(60) Provisional application No. 60/421,762, filed on Oct. 28, 2002.

(51) Int. Cl.
*G06Q 30/00* (2006.01)
*G06F 15/173* (2006.01)
*G06F 17/00* (2006.01)

(52) U.S. Cl. .................. 705/14.4; 709/224; 707/705
(58) Field of Classification Search ............... 709/219
See application file for complete search history.

(56) References Cited

U.S. PATENT DOCUMENTS

| | | | | |
|---|---|---|---|---|
| 5,708,780 A | * | 1/1998 | Levergood et al. | 709/229 |
| 5,740,549 A | * | 4/1998 | Reilly et al. | 705/14 |
| 5,838,790 A | * | 11/1998 | McAuliffe et al. | 713/176 |
| 5,999,912 A | * | 12/1999 | Wodarz et al. | 705/14 |
| 6,243,865 B1 | | 6/2001 | Wei et al. | |
| 6,693,649 B1 | * | 2/2004 | Lipscomb et al. | 715/762 |
| 2001/0056575 A1 | | 12/2001 | Wei et al. | |
| 2002/0116494 A1 | * | 8/2002 | Kocol | 709/224 |
| 2002/0124246 A1 | * | 9/2002 | Kaminsky et al. | 725/9 |
| 2003/0208560 A1 | * | 11/2003 | Inoue et al. | 709/219 |

OTHER PUBLICATIONS

"Microsoft Press Computer Dictionary, Third Edition", copyright 1997, pp. 202-203.*
The HotMedia Architecture: Progressive and Interactive Rich Media for the Internet; Kumar et al. ;IEEE Transactions on Multimedia vol. 3 No. 2 Jun. 2001.*
Leading On-line Advertising Agencies Use IBM HotMedia in Next Generation Campaigns; IBM Press room—Oct. 26, 1998; New York; http://www-03.ibm.com/press/us/en/pressrelease/20408.wss.*
Solbright White Paper; "The Inside Edge on Rich Media Partnership Series"; Mar. 2001.*
Developer Center Article; Macromedia Flash Ad Tracking Made Easy; Eric Picard; http://www.adobe.com/devnet/rich_media_ads/articles/multitrack.html.*
Introducing the MFAA and the Macromedia Tracking Kit; Bill McCloskey; Jan. 24, 2001; http://clickz.com/showPage.html?p.=clickz_print&id=835731.*

(Continued)

*Primary Examiner* — Yehdega Retta
(74) *Attorney, Agent, or Firm* — Greenberg Traurig, LLP

(57) ABSTRACT

A method and system for providing an ad is disclosed. The method of one embodiment comprises combining an ad input file with a conduit file to create an integrated ad file, wherein the ad input file identifies at least the content of the ad and the conduit file identifies at least the tracking data for the ad. The integrated ad file may then be served. According to a further embodiment, the method further includes effectuating a modification to the ad content by updating the ad input file, recombining the modified ad input file with the conduit file to create a modified integrate ad file and serving the modified integrated ad file.

31 Claims, 9 Drawing Sheets

OTHER PUBLICATIONS

A Brighter Flash, The Macromedia Flash Ad Alliance; Sandy Serva; Econtent; May 2001, 24, 3; ABI/INFORM Global.*

DoubleClick Unveils New Features for DART to Streamline the Management of Rich Media Creatives; DoubleClick Rolls out Rich Media Vendor Certification Program; Business, Technology, Advertising & Media Editors; Business Wire. New York: Oct. 15, 2001. p. 1. http://proquest.umi.com/pqdweb?index=0&sid=7&srchmode=1&vinst=PROD&fmt=3&startpage=-1&client.*

Macromedia—Press Room, 2001; : Macromedia and WebSideStory Bring Real-Time Tracking and Analysis service to Macromedia Flash sites. http://web.archive.org/web/20030608064019/www.macromedia.com/macromedia/proom/pr/2001/websidest.*

Macromedia—Rich Media Ad Developer's Kit, Designer's Guide: Building Macromedia Flash banners with Tracking Capabilities. http://web.archive.org/web.20010331033849/www.macromedia.com/solutions.richmedia/tracking/desingers.*

Macromedia—Rich Media Ad Developer's Kit; Ad Serving Network's Guide: Trafficking Macromedia Flash Banners; http://web.archive.org/web/20010626063240/www.macromedia.com/solutions/richmedia/tracking/advertising.*

DoubleClick, DoubleClick International; Flash Tracking with Variables Jan. 8, 2001.*

DoubleClick, as disclosed in DoubleClick International, Jan. 8, 2001; (http://demo.doubleclick.com/generators/docs/designer_version.pdf) hereinafter DoubleClick.*

Macromedia Flash 5, Quick Reference Card, Custom Guide, Your Organization's personal Trainer.*

YAHOO! Flash Banner Ads.*

Colin Moock, ActionScript: The Definitive Guide: Chapter 13:Movie Clip; O'Reilly, Online Catalog, May 2001.*

DoubleClick in view of Macromedia Flash Advanced for Windows an Macintosh: Visual QuickPro Guide by Russell Chun May 8, 2002 first edition.*

Yahoo! Flash Banner Standards for Designers.*

Macromedia/Adobe Flash Trafficking Guide (DFA).*

How to target variables in a Flash Player 5 movie, http://kbe.adobe.com/cps/140/tn_14087_html (6 of 6).*

Macromedia Flash Trafficking Guide.*

Flash Ads on Yahoo!*

Macromedia Unveils Macromedia Flash MX, Press Room 2002 Press Releases; Mar. 4, 2002.*

Rich Media Advertising Resource Center; Tracking Macromedia Flash (SWF) Movies, Ad.*

International Preliminary Examining Authority, Written Opinion for PCT/US03/34305.

* cited by examiner

HTML, JAVASCRIPT, AND FLASH INTERACTION

Query String Variable are declared in HTML
var flashfile = 'http://produce.yahoo.com/lem/conduit/
ad_done.swf?targID=_top&adID='+track+'&ap='+path+'&htmlurl1='+URL1+'";

```
<script language=JavaScript>
var track="http://rd.yahoo.com/%space%";
var path="http://img.yahoo.com/server/path";
var URL1 = "http://www.yahoo.com";
var URL2 = "http://www.advertiser.com";

var flashfile = 'http://produce.yahoo.com/lem/conduit/
    ad_done.swf?targID=_top&adID='+track+'&ap='+path+'&htmlurl1='+URL1+'&htmlurl2='+URL2+";
var altURL = "http://www.yahoo.com/altimageurl";
var altimg  = "http://img.yahoo.com/server/path.gif";
var width = 468;
var height = 60;
</script>
<script language=JavaScript src=http://img.yahoo.com/server/sniffer.js>
</script>
<noscript>
<a href="http://www.yahoo.com/altimageurl" target=_top><img
src="http://http://img.yahoo.com/server/path.gif" width=468 height=60 border=0></a>
</noscript>
```

FIG. 3

HTML CODE 202

Variable Descriptions var track = Unique Tracking Identifier;
var path = The Server path for where the SWF files reside
var URL1 = This is states the First URL for the exit code (htmlurl1 in the ad_input.swf)
var URL2 = This is states the Second URL for the exit code (htmlurl2 in the ad_input.swf)

// You can add multiple var URL# for as many URLS are needed. As long as you state them in the Query string in the var flashfile.

var flashfile = The path of the Inital Flash file that went through the Merge Tool.

targID=_top Identifies if the url will open in a new window or in the parent window.
adID='+track+' Identifies tracking string.
ap='+path+' Identifies the path of the swf files on the server.
htmlurl1='+URL1+' Identifies URL1 in the query string
htmlurl2='+URL2+"; Identifies URL2 in the query string var altURL = Identifies the URL for the alternate image
var altimg  = Identifies the path for the alternate gif image
var width = Identifies width of the ad unit
var height = Identifies height of the ad unit

FIG. 4

```
var plugin = (navigator.mimeTypes && navigator.mimeTypes["application/x-shockwave-flash"]) ?
navigator.mimeTypes["application/x-shockwave-flash"].enabledPlugin : 0;
if ( plugin ) {
        plugin = parseInt(plugin.description.substring(plugin.description.indexOf(".")-1)) >= 3;
}
else if (navigator.userAgent && navigator.userAgent.indexOf("MSIE")>=0 &&
navigator.userAgent.indexOf("Windows")>=0) {
        document.write('<SCRIPT LANGUAGE=VBScript> \n');
        document.write('on error resume next \n');
        document.write('plugin = (
IsObject(CreateObject("ShockwaveFlash.ShockwaveFlash.4")))\n');
        document.write('</SCRIPT> \n');
}
if ( plugin ) {
        document.write('<OBJECT classid="clsid:D27CDB6E-AE6D-11cf-96B8-444553540000"');
        document.write('
codebase="http://download.macromedia.com/pub/shockwave/cabs/flash/swflash.cab#version=4,0,0,0" ');
        document.write(' ID=flash5clickTAG WIDTH='+width+' HEIGHT='+height+'>');
        document.write(' <PARAM NAME=movie VALUE="'+ flashfile +'"><param name=wmode
value=opaque><PARAM NAME=loop VALUE=true><PARAM NAME=quality VALUE=high> ');
        document.write(' <EMBED src="'+ flashfile +'" loop=true wmode=opaque quality=high ');
        document.write(' swLiveConnect=FALSE WIDTH='+width+' HEIGHT='+height+'");
        document.write(' TYPE="application/x-shockwave-flash"
PLUGINSPAGE="http://www.macromedia.com/shockwave/download/index.cgi?P1_Prod_Version=Sh
ockwaveFlash">');
        document.write(' </EMBED>');
        document.write(' </OBJECT>');
} else if (!(navigator.appName && navigator.appName.indexOf("Netscape")>=0 &&
navigator.appVersion.indexOf("2.")>=0)){
        document.write('<A HREF="'+ altURL +'" target="'+target+'"><IMG SRC="'+ altimg +'"
WIDTH='+width+' HEIGHT='+height+' BORDER=0></A>');
}
```

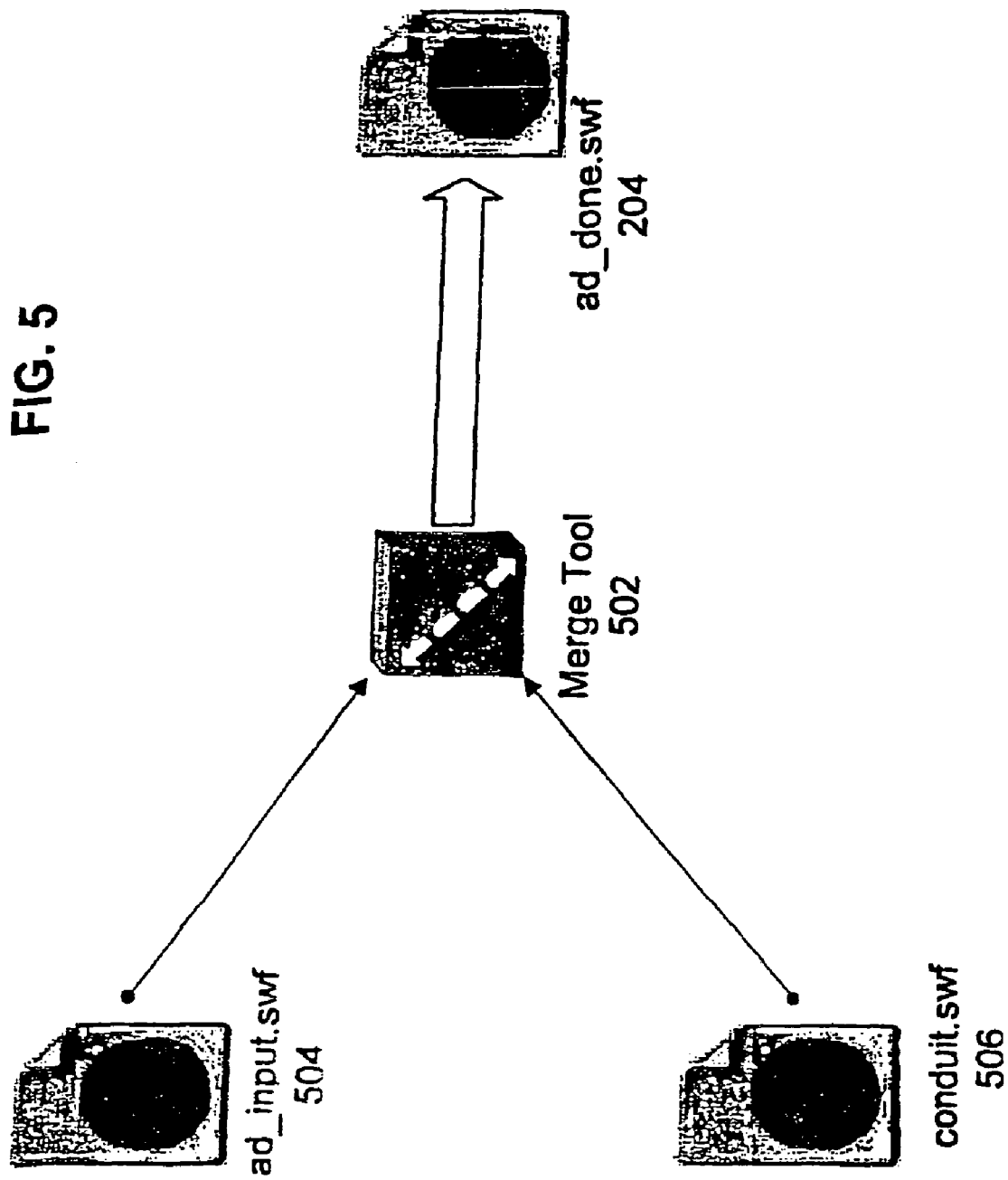

| Type | Location | Frame No | Instance of |
|---|---|---|---|
| Frame action | Timeline | 1 | |
| Frame action | Timeline | 4 | |
| Frame action | Timeline | 5 | |
| Frame action | Timeline | 6 | |
| Frame action | Timeline | 7 | |
| Frame action | Timeline | 9 | |
| Frame action | Timeline | 10 | |
| Frame action | Timeline | 11 | |
| Frame action | Timeline | 12 | |
| Frame action | Timeline | 13 | |
| Frame action | Timeline | 14 | |
| Frame action | Timeline | 15 | |
| Frame action | Timeline | 16 | |
| Frame action | Timeline | 17 | |
| Frame action | Timeline | 18 | |
| Frame action | Timeline | 19 | |
| Frame action | Timeline | 20 | |
| Frame action | Timeline | 21 | |
| Frame action | Timeline | 22 | |
| Frame action | Timeline | 23 | |
| Frame action | Timeline | 24 | |
| Frame action | Timeline | 25 | |
| Frame action | Timeline | 26 | |
| Frame action | Timeline | 27 | |

```
trackingCode = _level0/:adID;
targetUrl = _level0/:targID;
redirectURL = (trackingCode add "Unquie Identifier") add _level0/:exit1;
if (targetUrl == "_top") {
    wind ="";
} else {
    wind = ", \"_blank\"";
}
status = redirectURL add wind;
getURL (redirectURL, wind);
```

METHOD AND SYSTEM FOR CREATING, SERVING AND TRACKING ADVERTISEMENTS

CROSS REFERENCE TO RELATED APPLICATIONS

The present applications claims the benefit of U.S. Provisional patent Application Ser. No. 60/421,762, entitled METHOD AND SYSTEM FOR CREATING, SERVING AND TRACKING ADVERTISEMENTS, filed Oct. 28, 2002, which application is hereby incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to providing advertisements (ads) via a network, such as the Internet and, more particularly, to methods and systems for providing creation, serving and tracking of ads.

2. Description of Related Art

With the advent of the Internet, an industry has arisen focused on serving ads. Such industry includes marketers or advertisers, which typically undertake the marketing of their own products and services, ad agencies, which typically undertake planning, creating, executing and tracking ad campaigns on behalf of their clients, and web publishers, which typically operate one or more websites and sell ad space on such sites. The tracking of ads and ad campaigns generally involves monitoring the effectiveness of each ad, for example, by the number of times the ad is viewed by a users (often referred to as a "page view"), the number of times a user activates a link in the ad to the advertiser's web page (often referred to as a "click-through"), the number of times a user makes a purchase after activating a link in the ad (often referred to as an "acquisition"). To effectively track ads, the computer code that comprises the ad contains code that monitors the relevant metrics.

Numerous companies have been created to provide software tools to assist such entities involved in the advertising industry. These tools often purport to simplify and increase the efficiency of the planning, execution and analysis of ad campaigns. Despite such tools, ads and ad campaigns can be difficult to create, execute and analyze.

For example, the processes of providing, or "serving," the ads and tracking the ads can be technically complicated, especially where one entity is serving a large number of ads. An ad is typically an item of computer code that is pulled from an ad server and incorporated into the desired Web page. In general, the entity serving the ads receives the advertising content from the advertisers or agencies and must incorporate the content into the ad code. Such a process is labor intensive and requires the ad-serving entity to maintain a staff of programmers. These programmers must be used not only to incorporate the received ad content into the ad code to be served, but also to effectuate changes to the ad content received from the advertiser or agency. Such work is labor intensive and results in both decreased profits for the entities serving the ads and, to the extent the cost is not completely absorbed by the entity serving the ad, increased advertising costs to the advertiser and/or agency.

To make matters worse, there are no meaningful economies of scale. Working with more ad agencies and serving more ads only requires a greater number of programmers to address these problems. In short, serving more ads exacerbates the problems.

The existing ad tools do not adequately address these problems. Accordingly, there exists a need for an improved system and method for creating, serving and tracking ads.

SUMMARY OF THE INVENTION

These and other needs are satisfied by the present invention. According to one embodiment, a method for providing an ad is disclosed. The method comprises combining an ad input file with a conduit file to create an integrated ad file, wherein the ad input file identifies at least the content of the ad and the conduit file identifies at least the tracking data for the ad. The integrated ad file may then be served. According to a further embodiment, the method further includes effectuating a modification to the ad content by updating the ad input file, recombining the modified ad input file with the conduit file to create a modified integrate ad file and serving the modified integrated ad file.

BRIEF DESCRIPTION OF THE DRAWINGS

The following drawings, which are attached hereto and form a part hereof, are exemplary in nature and are not meant to be limiting of the scope of the present invention.

FIG. 3 is html code for calling an ad, according to one embodiment of the present invention.

FIG. 4 is a JavaScript file called by the html code of FIG. 2, according to one embodiment of the present invention.

FIG. 5 is a schematic illustrating the process flow at the portal, according to one embodiment of the present invention.

FIG. 7 is a screen shot of a portion of a conduit file, according to one embodiment of the present invention.

FIG. 9 is a screen shot of another portion of an integrated ad file, according to one embodiment of the present invention.

DETAILED DESCRIPTION OF EXEMPLARY EMBODIMENTS

Figure 1:
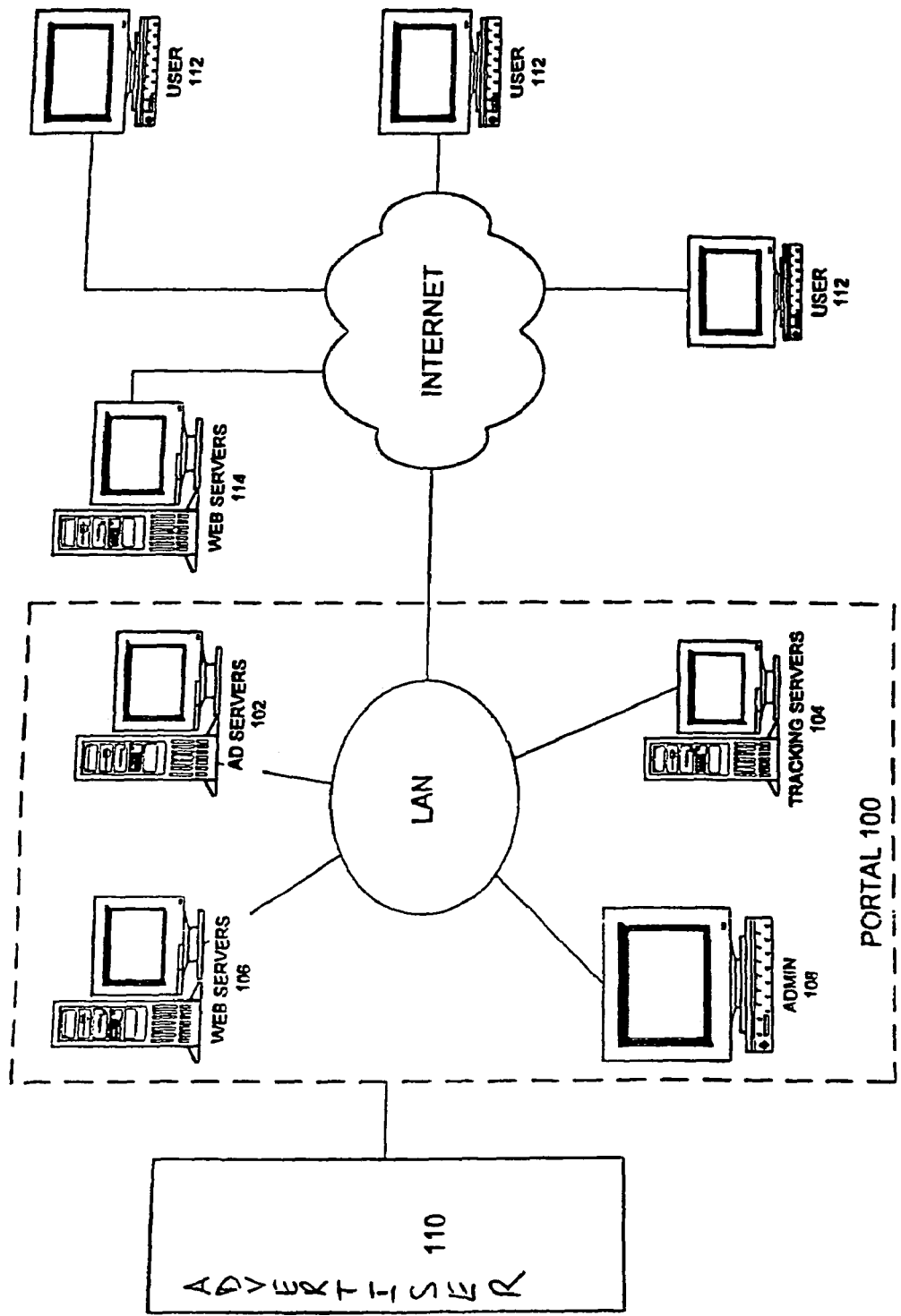
FIG. 1 is an overall schematic illustrating the system according to one embodiment of the present invention.

Certain embodiments of the present invention will now be described in connection with the aforementioned. Turning first to FIG. 1, an exemplary system according to one embodiment is shown. As illustrated, portal 100 includes several components for serving and tracking ads. In this regard, portal 100 includes one or more ad servers 102 for serving ads, one or more tracking servers 104 for tracking user responses to ads, one or more web servers 106 for providing web pages and one or more workstations 108 in communication via a network, such as a local area network (LAN). The LAN, in turn, is coupled to a network, such as the Internet. Although not separately shown, portal 100 also includes data storage for providing the functionality described herein. Furthermore, it is to be understood that the particular type and arrangement of components is not essential to the present invention; for example, a single server could provide the function of both the ad server and tracking server.

Although the portal 100 is described as serving and tracking the ads, it is to be understood that it is within the scope of the present invention to have one or more different entities serving and/or tracking ads. Furthermore, although the term "portal" is used to describe the entity, the term is meant to encompass all types of entities, includes those operating web portals, such as Yahoo! Inc., advertisement technology companies, such as DoubleClick, Inc., e-commerce sites, such as Cnet.com, and the like. Similarly, reference to advertiser 110 is meant to encompass any entity requesting an ad be served or tracked, including the advertiser, ad agency, and other entities involved in the ad process.

The portal 100 is in communication, either electronically or otherwise, with an advertiser 110. In general, the advertiser, on behalf of itself or its clients, creates ads to be served to users 112 via the Internet. As described in greater detail below, the advertiser 110 submits an electronic ad input file to the portal 100 that contains the ad message, specifying the required text, graphics and other content in the ad. The ad may be part of a webpage served by the portal's web server 114 or by another web server 114, for example, one operated by the advertiser 110. The ad may also include one or more buttons (or other actions) that allow users 112 to link to other websites, for example, those provided by the web servers 114 of the advertiser or its clients.

Notably, the electronic file submitted by the advertiser 110 in the present embodiment, is in certain respects, of a standard format, regardless of the particular ad content and tracking methodology being use. This standardized format provides greater ease and flexibility in editing and serving the ad and tracking the responses of users 112. More specifically, because the ad content is merged with the code necessary for tracking the ad, as described below, the advertiser 110 may provide the content to many different portals without concerning itself with the difference in portal tracking methodologies. Similarly, portals may select a tracking methodology and implement it independently from the ad content. On one hand, advertisers may modify the ad content without implicating changes to the tracking code, and on the other hand, portals may modify the tracking methodology and code without implicating changes to the ad content.

The users 112 access the Internet with any suitable hardware and software, for example, a personal computer running an Internet browser, such as that provided by Microsoft Corporation under the trade name INTERNET EXPLORER. In the present embodiment, the ad is prepared using Macromedia Flash, for example, version 5. Therefore, the user 112 also has Flash software plug-ins necessary to view the ads.

Having identified the entities related to the present embodiment, operation of the present embodiment will now be described in greater detail with reference to FIGS. 2-9.

Figure 2:
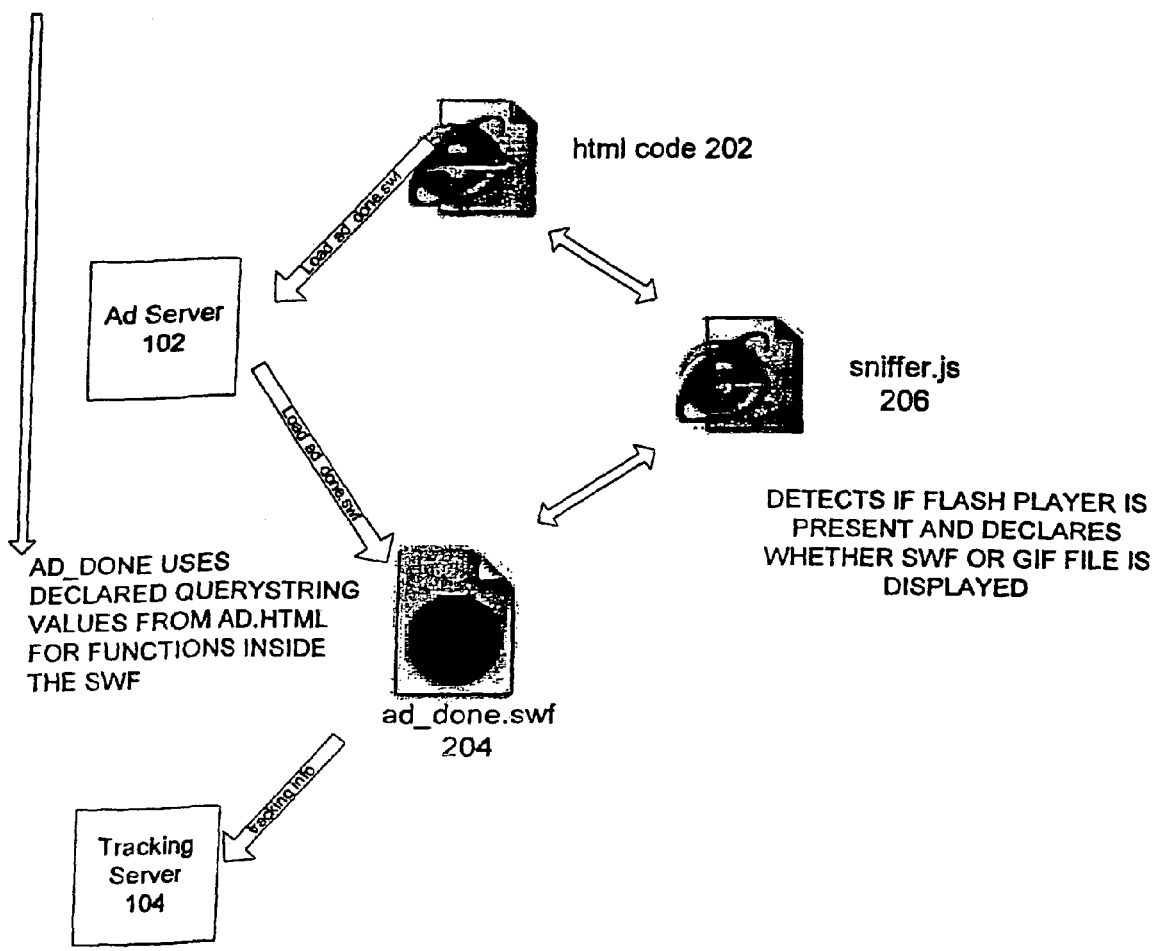
FIG. 2 is a schematic illustrating the process flow of the system according to one embodiment the present invention.

FIG. 2 illustrates the general operation of the present embodiment in which a user 112 accesses a web page, for example, the portal's home page provided by web server 106 or another page provided by a web server 114. The web page includes html code (ad.html) 202 for loading an integrated ad file 204 from the ad server 102. As will be described in greater detail below, the integrated ad file 204 reflects the integration or combination of two separate files: an ad input file, primarily including the contents of the ad, and a conduit file, primarily including code used in tracking the ad. Because Macromedia Flash is used in the present embodiment, the files have ".swf" extensions; thus, the integrated ad file is generically referred to as "ad_done.swf"; the electronic ad input file 504 submitted by the Advertiser 110 is generically referred to as "ad_input.swf"; and the conduit file created by the portal 100 is generically referred to as "conduit.swf."

The html code 202 also calls a JavaScript file ("sniffer.js") 206. As will be described in greater detail below, the html code 202 declares a query string variable for the ad, and the integrated ad file 204 uses the declared query string values from the html code 202 to perform functions specified within the integrated ad file 204. Additionally, when a user 112 activates a button in the ad and is linked to another web page, the integrated ad file 204 acquires relevant tracking data and provides it to tracking server 104.

The html code 202 and JavaScript 206 will be described in greater detail below with reference to FIGS. 3 and 4, respectively.

Exemplary html code 202 will now be described with reference to FIG. 3. In general, the code 202 relates to several functions, including: (1) indicating to the ad server 102 whether the user 112 activating a button to link to another web page should open that web page in the same or different window; (2) providing an array of uniform resource locators (URLs), which correspond to variables in the integrated ad file 204; and (3) declaring the query string and other variables related to tracking the ad by the integrated ad file 204.

Determining whether or not a user's link to another web page opens in a same or different window involves the integrated ad file 204 pulling the "targID" variable specified in the html code 202. As described in greater detail below with regard to FIGS. 5 and 7, the integrated ad file 204 includes code (incorporated from the conduit file also described below) that pulls the value of the "targID" variable and, depending on the value of the variable, either provides the ad in a new window or in the same window.

The html code 202 also specifies the URLs associated with the buttons of the ad. To accomplish this, the code 202 includes an array of URLs (at lines 4-5). In the present embodiment, these variables are "URL1" and "URL2." As will be appreciated by those skilled in the art, the invention is scalable in that greater or fewer URLs may be specified in the ad and html code. As will be discussed in greater detail below in connection with FIGS. 5 and 6, the URLs specified in the html code 202 are pulled by the integrated ad file 204 and associated with the button actions in the ad.

The html code 202 also includes several lines of code and variables directed to tracking the ad. In this regard, the code 202 includes a unique tracking identifier (var track) and, in the query string, a tracking string (adID='track+'). The unique tracking identifier specifies a redirection URL and a tracking variable. As is known in the art, the redirection URL is used to provide tracking information to the tracking server 104. When the ad is served, the integrated ad file 204 appends the appropriate tracking data to the redirection URL. In the present embodiment, such tracking data includes the relevant invoice order for the ad campaign, the line number for the ad campaign, the placement of the ad on the web page, the content identifier (ID) for the ad, which identifies the ad in the content management system of the portal 100, and the ad ID, which is a unique identifier for the ad. It is to be understood, however, that the particular tracking data utilized is not essential to the present invention and that the present invention encompasses tracking more or less data, including, for example, non-click-through data, such as changing the volume of an ad, pausing an ad, loading a different ad, and the like.

Because the html code 202 loads the integrated ad file 204, the code 202 also includes the server and path where the integrated ad file resides ("var flashfile"). Similarly, the code 202 also specifies the path of additional ad files used in the ad ("var path"; "ap='+path+'"). The path information is included for such additional ad files, e.g., where the integrated ad file 204 loads additional movies, such as sounds associated with a button other than an exit event.

The html code 202 also specifies the width ("var width") and height ("var height") of the ad, as well as the URL for an alternate image ("var altURL") and the path for the alternate image ("var altimg").

FIG. 4 illustrates the JavaScript file 206 called by the html code 202. In general, the JavaScript file 206 functions to determine whether the user 112 has at its computer the appropriate browser and Flash plug-ins. If the JavaScript file 206 determines that the plug-ins do not exist at the user 112, then the file 206 supplies the alternative .GIF, .JPG or other formatted image specified in the html code 202.

FIG. 5 illustrates operations performed by the portal 100 (e.g., an administrator 108) in creating the integrated ad file 204 to be served via the ad server 102. As illustrated, the portal 100 uses a merge tool 502 to combine the contents of an ad input file 504 provided by the Advertiser 110 with the contents of a conduit file 506 created by the portal 100. In general, the ad input file 504 contains the content of the ad, as provided by the advertiser, and the conduit file 506 contains code for tracking the ad.

The merge tool 502 of the present embodiment is an executable program that combines the content of the ad file 504 with the contents of the conduit file 506 to create an integrated ad file 204 ("ad_done.swf"). The merge tool 502 may take any number of forms, may have any number of different user interfaces, and may be written in any number of languages, including C++, Java, Perl, and the like. As such, the merge tool make take the form of a web-based application accessible via an Internet Web page.

In the present embodiment, the merge tool 502 replaces an empty movie clip object in the ad input file 504 with the conduit file 506, which is a one pixel by one pixel ad (and therefore does not appear in the ad) that includes additional lines of code directed to the tracking information. More specifically, the merge tool 202 of the current embodiment inserts the conduit file 506 into the ad input file 504 by first identifying in the ad input file 504 an empty movie clip into which the conduit file 506 will be inserted. As will be apparent to those skilled in the art, it is preferable to insert the conduit file 506 into an empty layer of the ad input file 504 so that the contents of the conduit file 506 do not obscure other aspects of the ad. Such movie clip can be thought of as a "placeholder" for the conduit file 506. To identify the empty movie clip, it is given a predefined name (e.g., "conduit_mc"). The advertiser 110 can be apprised of the need for an empty movie clip layer with the predefined name, which can be inserted in all ad input files when created. Once the merge tool 202 locates the empty layer by name, the merge tool 202 converts the conduit file 506 into the movie clip in the ad input file 504, and creates the new integrated ad file 204.

In an alternate embodiment, rather than include an empty movie clip object, the ad file uses a load movie call to a new Flash layer, into which the conduit file 506 is merged. In general, any method that allows the contents of the files 504, 506 to be combined may be used. Furthermore, although the present embodiment involves incorporating the contents of the conduit file 506 into the ad input file 504, alternate embodiments involve incorporating the ad input file into the conduit file and combining the two files into a third file (e.g., a third file having two empty movie clip objects, one for each the ad input and conduit file; or a third file with two load movie calls; or a third with one empty movie clip object and one load movie call). The integrated ad file 204 is, in essence, a restructured ad file that includes scripts for presenting and handling tracking of the ad.

Those skilled in the art will appreciate that the present embodiment need only load a single file—the integrated ad file 204—when serving the ad. The integration of the ad input file 504 and the conduit file 506 prior to serving the ad permits this efficiency. An alternative is loading a first ad file (for example, one file containing the content of the ad), which, in turn, loads a second ad file (for example, one file containing the tracking information). Such alternative has the disadvantages of utilizing additional bandwidth of the ad server (i.e., loading of the single integrated ad file verses loading two separate files) and the potential for failure of the second ad file to load properly. Indeed, with a portal or other provider serving numerous ads, these disadvantages make the alternative of serving two separate files commercially unworkable.

Figure 6:
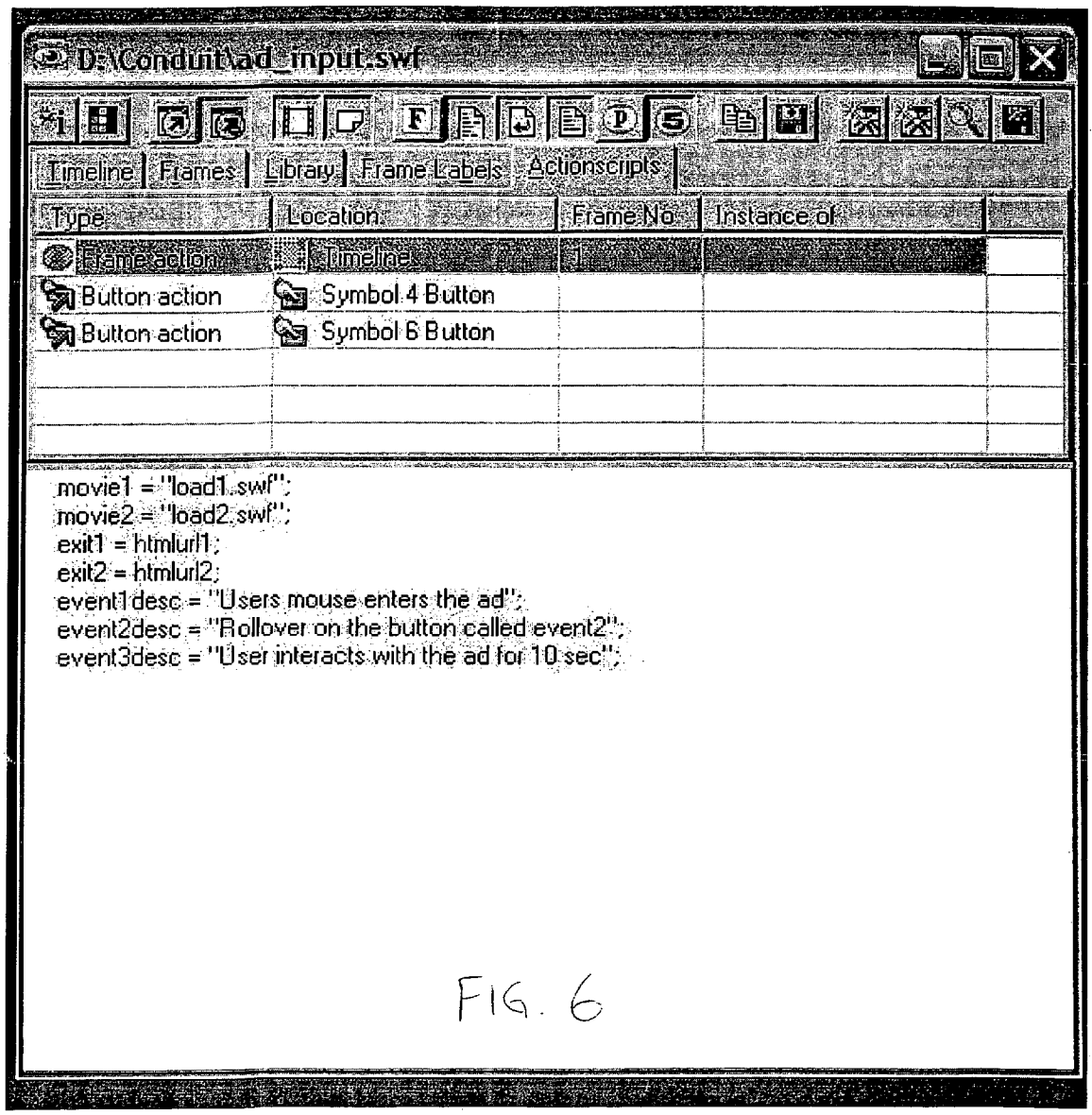
FIG. 6 is a screen shot of a portion of an ad input file, according to one embodiment of the present invention.

Exemplary ad files will now be described in greater detail with reference to FIGS. 6-9. FIG. 6 illustrates a portion of the exemplary ad file 504 (frame 1), as viewed through an ActionScript viewer. In the present embodiment, the Advertiser 110 has created an ad with two buttons, each of which allows the user 112 viewing the ad to be linked to a different URL. These URLs are not included in the ad file 504 itself, but rather ad file 504 includes an exit code for each URL ("htmlURL1", "htmlURL2") that points to the URL provided in the HTML code 202 that calls the integrated ad file 204. More specifically, as noted above in connection with FIG. 3, the html code 202 includes a query string that correlates the URL variable from the ad input file 504 to a URL in the URL array of the html code 202 ("htmlURL1='+URL!+'") (where URL1 is stated to be "http://www.yahoo.com" and URL2 can be, for example, the advertiser's website, represented by "http://www.advertiser.com").

As will be appreciated by those skilled in the art, by including only a variable (exit code) in the ad input file 504 and including the actual URL in the HTML code, greater flexibility is provided to change the URLs. In other words, if the URLs were included in the ad file 504 and the ad file 504 was provided by the Advertiser 110, the Advertiser 110 would need to change the URLs and provide the portal 100 a new ad file 504 for each such change. In contrast, the present embodiment allows for changes to the URLs to be made to the html code 202 that calls the integrated ad file 204 without necessarily involving the entity serving the ad. Nevertheless, in alternate embodiments in which such flexibility is not required, the ad file 504 includes one or more URLs associated with one or more button actions.

FIG. 7 illustrates a portion of an exemplary conduit file 506, as viewed through an ActionScript viewer. More specifically, FIG. 7 illustrates the ActionScript associated with frame 9 of the file 506. As will be appreciated by those skilled in the art, the conduit file 506 provides ActionScript for tracking the ad and for determining whether the ad opens in the same window in which the html code 202 is embedded or in a new window.

In connection with tracking the ad, the ActionScript builds the redirection URL used in tracking. To this end, the conduit file 506 sets forth the root level of the integrated ad file 204 ("_level0:/"), which references the "adID" variable of the query string in the html code 202 that loads the integrated ad file 204 from the ad server 102.

As will be apparent to those skilled in the art, the ActionScript from the conduit file 506, when merged into the integrated ad file 204, references variables that are populated by the html code 202 (e.g., "adID" corresponds to "+track+adID" corresponds to "http://rd.yahoo.com/%space%").

Furthermore, after the integrated ad file 204 is live on a web site (e.g., the portal's website or any other web site), the integrated ad file 204 uses the stated variable "track" and appends the exit code URL string (as defined in the html code 202) to the track URL string (Track url+Exit Url).

To determine whether or not the ad should be opened in a new or the same window, the conduit file 506 includes an "if" statement to determine, based on the value of the "targID" variable in the html code 202, whether the ad opens in a new window or the same (i.e., parent) window. As illustrated, the "if" statement operates on the "targetURL" variable, which comprises the root level of the integrated ad file 204 and the "targID" variable populated from the html code 202. In the present embodiment, if the "targID" variable equals "_top", then the URL in the URL array of the html code 202 corresponding to the exit code in the integrated ad file 204 will open in a new window. If the value of the "targID" variable is "_blank" or something other than the "_top", then the URL opens in a new window. More specifically, this functionality is achieved by concatenating the redirection URL ("redirectURL") with a window open call, as set forth in the "if" statement ("wind"). Thus, the script "getURL(redirectURL, wind)" is used.

It will be appreciated by those skilled in the art that including such functionality in the conduit file 506 provides the entity serving the ad with greater flexibility and control over the presentation of the ad. In short, the portal or other entity serving the ad can simply change the conduit file 506 locally to adjust the display of the ad, thereby retaining greater control over presentation of the ad. It is also within the scope of the present invention to include the functionality for determining whether to open a new window in any of the other files described herein or even a separate file. In one such embodiment, the JavaScript file 206 includes code that utilizes the open window function to determine whether to open a new window, as follows:

```
function openWindow(x) {
if(targID = = "_top") {
    top.location=URL[x]
} else {
    window.open(URL[x]);
    }
}
```

In this alternate embodiment, the JavaScript file reads the value of the "targID" variable in the html code 202. In the present embodiment, if the variable equals "_top", then the URL corresponding to the "xth" URL in the URL array of the html code 202 will open in a new window. If the value of the "targID" variable is something other than the "_top", then the JavaScript function "window.open" causes the URL to open in a new window. As will be appreciated by those skilled in the art, such an embodiment also provides advantages of flexibility and ease of implementation.

The conduit file 504 also includes an optional unique identifier. The unique identifier is any special text that the entity serving the add can add (e.g., "R=1 Flash_ad_first_url_click") for making advertising statistics easier to read. More specifically, using the identifier allows the ad to be identified with meaningful text, rather than with numbers.

In certain embodiments, portal 100 includes additional code that acts as a filter. For certain URLs the filter overrides or sets a default value for the targID value, thereby dictating whether the ad opens in the same or different window. The filter may reside at the ad server 102 or any other server associated with the portal 100. For example, in one embodiment, where the ad html code is part of an Internet e-mail page, an e-mail server includes the filter and causes the html code to specify that the ad open in the same window being provided to the user 112. Such filter ensures the user 112 remains at the e-mail page, rather than being redirected to another web page.

Figure 8:
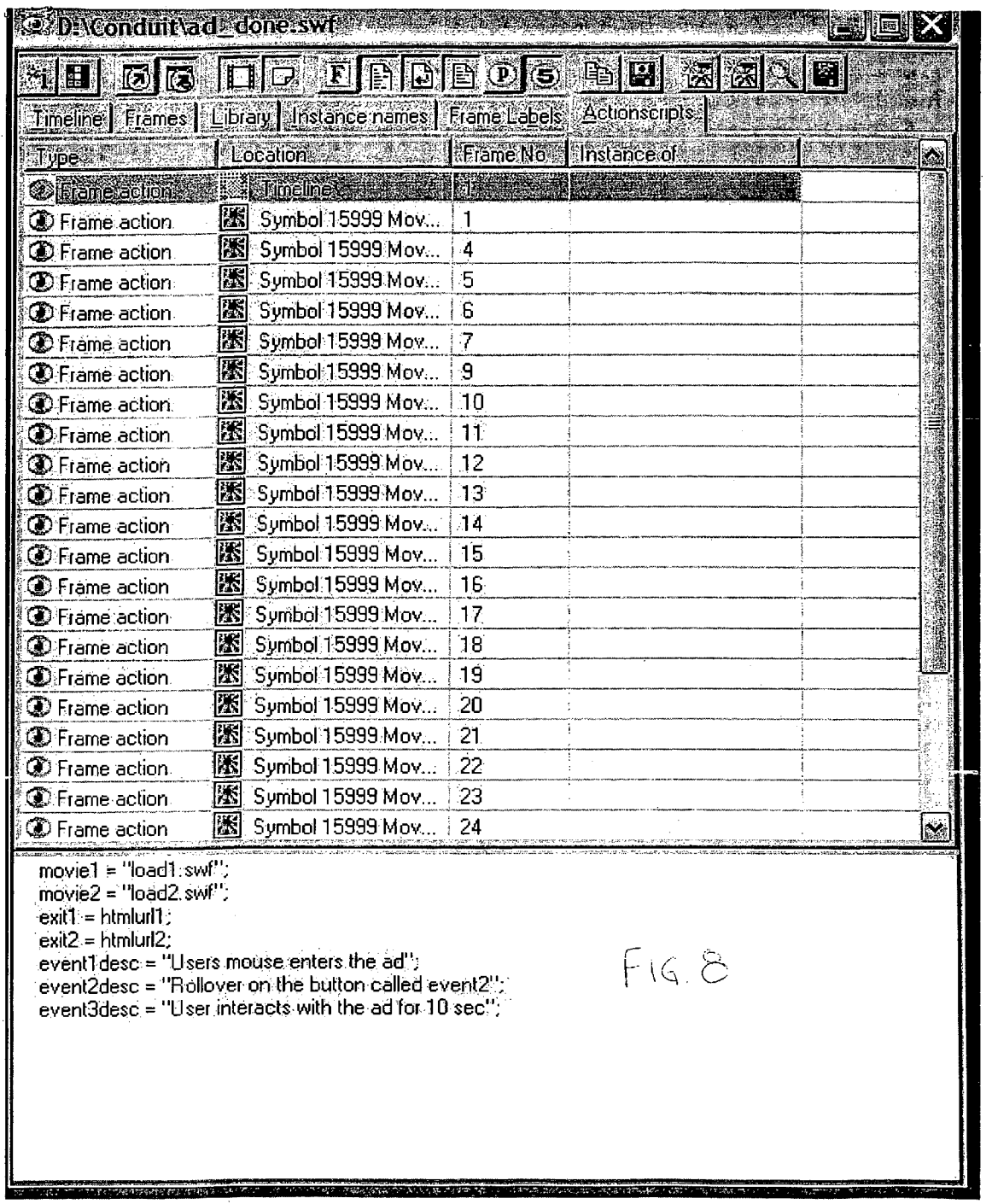
FIG. 8 is a screen shot of a portion of an integrated ad file, according to one embodiment of the present invention.
Figure 9:
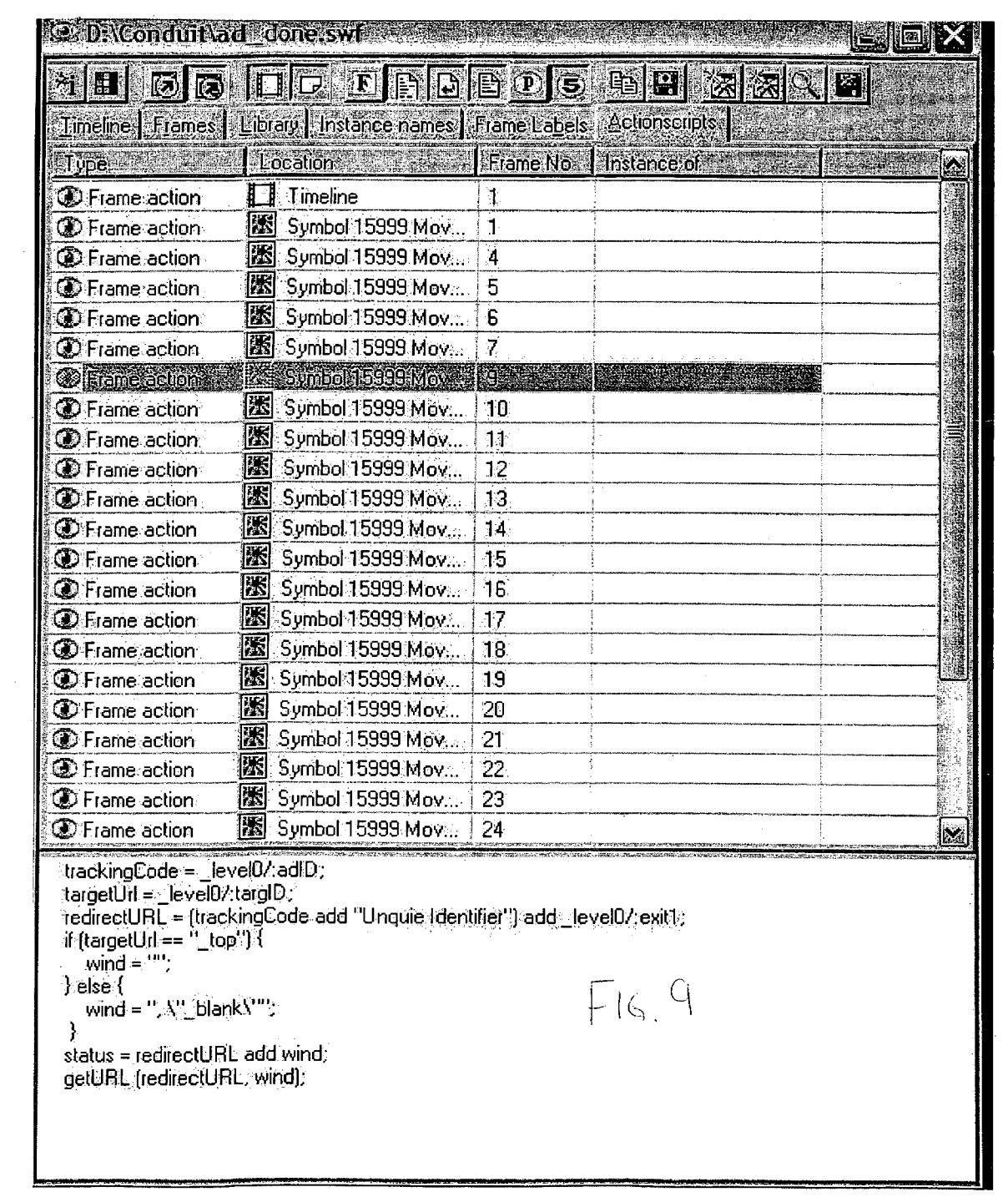

FIG. 8 illustrates a portion of the integrated ad file 204. As illustrated, frame 1 of the ad file 204 includes the references to the URLs contained within the ad input file 504. Similarly, FIG. 9 illustrates that frame 9 of the integrated ad file 204 contains the ActionScript from the conduit file 506 for the same frame. As such, the merge tool 202 has replaced the empty movie clip object of the ad input file 504 with the contents of the conduit file 506.

Those skilled in the art will recognize that the method and system of the present invention has many applications, may be implemented in many manners and, as such, is not to be limited by the foregoing exemplary embodiments and examples. In this regard, any number of the features of the different embodiments described herein may be combined into one single embodiment. Moreover, the scope of the present invention covers conventionally known and future developed variations and modifications to the system components (e.g., hardware, software, programming languages, communication networks, etc) described herein, as would be understood by those skilled in the art.

What is claimed is:

1. A method for providing an ad via a computer network, the method comprising:
   combining, at a server, an ad input file with a conduit file separate from the ad input file, the combining using a merge tool that automatically creates a single integrated ad file from the ad input file and the separate conduit file prior to the server serving the integrated ad file, the single integrated ad file having a single file extension and containing both the ad input file contents and the conduit file contents, wherein the ad input file identifies the content of the ad and the conduit file comprises computer code to identify tracking data for the ad; and
   serving the single integrated ad file from the server to provide the ad.

2. The method of claim 1 further comprising:
   receiving, at the server, a modified ad input file, the modified ad input file representing a change to the content of the ad;
   combining, at the server, the modified ad input file with the conduit file to create a modified single integrated ad file having a single file extension; and
   serving the modified single integrated ad file from the server, thereby providing the ad having the change.

3. The method of claim 1 further comprising:
   receiving, at the server, a modified conduit file, the modified conduit file representing a change to the tracking data;
   combining, at the server, the modified conduit file with the ad input file to create a modified single integrated ad file having a single file extension; and
   serving the modified single integrated ad file from the server, thereby providing the ad having the changed tracking data.

4. The method of claim 1 wherein the ad is a Flash ad and the conduit and ad files have .swf extensions.

5. The method of claim 1 wherein the ad input file includes an empty movie clip object and the combining includes inserting the conduit file into the empty movie clip object.

6. The method of claim 5 wherein the empty movie clip object is given a predefined name and the combining the ad input file and conduit file includes searching the ad input file for the predefined name.

7. The method of claim 1 wherein the ad includes one or more actions for linking to one or more web pages and wherein the ad input file specifies one or more button actions, each having an exit code, and wherein serving the single integrated ad file includes html code loading the single integrated ad file, the html code specifying URLs for the web pages.

8. The method of claim 1 wherein serving the single integrated ad file includes html code loading the single integrated ad file, the html code including a variable and wherein the conduit file includes code that determines whether the ad opens in a parent window or new window based on the variable.

9. The method of claim 1 wherein serving the single integrated ad file includes html code loading a JavaScript file, the html code including a variable and wherein the JavaScript file includes code that determines whether the ad opens in a parent window or new window based on the variable.

10. The method of claim 1 wherein serving the single integrated ad file includes html code loading the single integrated ad file, the html code including a tracking identifier, the method further comprising tracking the ad using code in the conduit file and the tracking identifier.

11. A method of facilitating providing an ad by loading a single integrated ad file, the method comprising:
identifying, at a server, a first file;
identifying, at the server, a second file, the second file being separate from the first file;
identifying, at the server, a placeholder in the first file; and
electronically inserting, by the server, the second file into the placeholder to create the single integrated ad file having a single file extension, the single integrated ad file including an ad and computer code to identify tracking data for the ad.

12. The method of claim 11 wherein the first file specifies ad content code and the second file contains ad-tracking code.

13. The method of claim 12 further comprising:
receiving, at the server, a modified first file, the modified first file representing a change to the ad content and including the placeholder; and
inserting, at the server, the second file into the placeholder in the modified first file to create a modified single integrated ad file having a single file extension.

14. The method of claim 11, wherein the first file identifies ad tracking data, the method further comprising:
receiving, at the server, a modified first file, the modified first file representing a change to the tracking data; and
inserting, at the server, the second file into the placeholder in the modified first file to create a modified single integrated ad file having a single file extension.

15. The method of claim 11 wherein the placeholder is an empty movie clip.

16. A method of facilitating providing an ad by loading a single integrated ad file, the method comprising:
identifying, at a server, a first file;
identifying, at the server, a second file, the second file being separate from the first file;
identifying, at the server, a third file, the third file being separate from the first and second files;
identifying, at the server, a first placeholder and a second placeholder in the third file; and
electronically inserting, by the server, the first file into the first placeholder and electronically inserting, by the server, the second file into the second placeholder to create the single integrated ad file having a single file extension, the single integrated ad file including an ad and the computer code to identify tracking data for the ad.

17. The method of claim 16 wherein the first placeholder is an empty movie clip.

18. The method of claim 16 further comprising html code in addition to the computer code, the html code loading the third file.

19. The method of claim 18 wherein the third file includes one or more buttons corresponding to links to one or more web pages, and wherein the html code specifies URLs for the one or more web pages.

20. The method of claim 16 wherein the inserting includes using an executable program.

21. The method of claim 16 wherein the inserting includes using a web-based application.

22. The method of claim 16 wherein the first file includes ad content, the single integrated ad file including the ad content and wherein the method is further for creating a modified single integrated ad file including a change to the ad content, the method further comprising:
identifying, at the server, a modified first file, the first file including the change;
inserting, at the server, the modified first file into the first placeholder and
inserting, at the server, the second file into the second placeholder to create the modified single integrated ad file having a single file extension.

23. The method of claim 16 wherein the first file includes ad tracking data, the single integrated ad file including the ad tracking data and wherein the method is further for creating a modified single integrated ad file including a change to the ad tracking data, the method further comprising:
identifying, at the server, a modified first file, the first file including the change;
inserting, at the server, the modified first file into the first placeholder and inserting the second file into the second placeholder to create the modified single integrated ad file having a single file extension.

24. A computer readable storage medium having computer executable instructions stored thereon for performing a method of creating a single integrated ad file used in providing an ad, the method comprising:
identifying, at a server, a first file;
identifying, at the server, a second file, the second file being separate from the first file;
identifying, at the server, a placeholder in the first file; and
electronically inserting, at the server, the second file into the placeholder to create the single integrated ad file having a single file extension, the single integrated ad file containing computer code to identify tracking data for the ad.

25. The computer readable storage medium of claim 24 wherein the first file is an ad input file and the second file is a conduit file.

26. The computer readable storage medium of claim 25 wherein the ad input file and conduit file are created using Flash.

27. The computer readable storage medium of claim 26 wherein the placeholder is a movie clip.

28. The computer readable storage medium of claim 25 wherein the single integrated ad file is for providing a modified ad, the method further comprising:
identifying, at the server, a modified first file, the modified first file including a change to the ad;

inserting, at the server, the second file into the placeholder to create a modified single integrated ad file having a single file extension, the single integrated ad file including the change.

29. The computer readable storage medium of claim 24 wherein the single integrated ad file includes one or more exit codes referring to one or more URL variables.

30. The computer readable storage medium of claim 29 wherein the single integrated ad file is designed to be loaded by code in addition to the computer code, the code specifying one or more URLs corresponding to the one or more URL variables, the code populating the one or more URL variables with the one or more URLs.

31. The method of claim 1, wherein the ad is provided to a user computer via the internet and the combining of the files is in response to receiving a request for a web page, and wherein serving the single integrated ad file includes providing the ad as part of the web page.

* * * * *